(12) United States Patent
Trakas

(10) Patent No.: US 8,449,799 B2
(45) Date of Patent: May 28, 2013

(54) VALVE GATE SYSTEM

(76) Inventor: Panos Trakas, Addison, IL (US)

( * ) Notice: Subject to any disclaimer, the term of this patent is extended or adjusted under 35 U.S.C. 154(b) by 0 days.

(21) Appl. No.: 13/332,809

(22) Filed: Dec. 21, 2011

(65) Prior Publication Data
US 2012/0119400 A1 May 17, 2012

Related U.S. Application Data

(62) Division of application No. 12/750,228, filed on Mar. 30, 2010, now Pat. No. 8,113,818.

(51) Int. Cl.
*B29C 45/28* (2006.01)

(52) U.S. Cl.
USPC ............................................. 264/39; 425/564

(58) Field of Classification Search
CPC .................................................... B29C 45/281
USPC ............................................................. 264/39
See application file for complete search history.

(56) References Cited

U.S. PATENT DOCUMENTS

| | | | |
|---|---|---|---|
| 3,491,408 A | 1/1970 | Natkins | |
| 4,698,013 A | 10/1987 | Butcher | |
| 4,747,770 A | 5/1988 | Schmidt | |
| 4,899,435 A | 2/1990 | Trakas | |
| 4,906,360 A | 3/1990 | Trakas | |
| 4,988,848 A | 1/1991 | Trakas | |
| 5,052,100 A | 10/1991 | Trakas | |
| 5,055,028 A | 10/1991 | Trakas | |
| 5,106,291 A | 4/1992 | Gellert | |
| 5,136,141 A | 8/1992 | Trakas | |
| 5,147,663 A | 9/1992 | Trakas | |
| 5,180,594 A | 1/1993 | Trakas | |
| 5,334,010 A | 8/1994 | Teng | |
| 5,454,991 A * | 10/1995 | Brew | 264/39 |
| 5,587,076 A | 12/1996 | Herzog | |
| 5,849,343 A | 12/1998 | Gellert et al. | |
| 5,935,615 A | 8/1999 | Gellert et al. | |
| 5,948,448 A | 9/1999 | Schmidt | |
| 6,074,191 A | 6/2000 | Gellert et al. | |
| 6,270,711 B1 | 8/2001 | Gellert et al. | |
| 6,386,508 B1 | 5/2002 | Steil et al. | |
| 6,599,116 B2 * | 7/2003 | Lee et al. | 425/564 |
| 6,739,863 B2 | 5/2004 | Olaru | |
| 7,172,410 B2 | 2/2007 | Trakas | |
| RE41,280 E | 4/2010 | Trakas | |

FOREIGN PATENT DOCUMENTS

| | | |
|---|---|---|
| EP | 0373293 A2 | 6/1990 |
| EP | 0407683 A2 | 1/1991 |
| EP | 0657270 A1 | 6/1995 |
| EP | 1025974 A2 | 8/2000 |

* cited by examiner

*Primary Examiner* — Yogendra Gupta
*Assistant Examiner* — Alison Hindenlang
(74) *Attorney, Agent, or Firm* — Momkus McCluskey, LLC; Jefferson Perkins

(57) ABSTRACT

A valve gate assembly comprises a piston that is actuable between a forward position and a rear position and has a piston stop surface and a forward pressure surface. A cylinder has a cylinder stop surface that is disposed to contact the piston stop surface when the piston is in the forward position. The cylinder stop surface is radially outward of at least a portion of the forward pressure surface and a shutoff pin is substantially aligned with the axis.

11 Claims, 11 Drawing Sheets

VALVE GATE SYSTEM

RELATED APPLICATIONS

This application is a division of U.S. patent application Ser. No. 12/750,228, filed Mar. 30, 2010, the specification and drawings of which are fully incorporated by reference herein.

BACKGROUND OF THE INVENTION

The present invention relates to the field of injection molding, particularly the design of valve gate systems. Referring to FIGS. 1A and 1B, valve gated injection molding systems according to the prior art such as the one, indicated generally at 100, use a reciprocating piston 108 connected to a shutoff pin 112 inside a melt-flow bore 114 to control the flow of molten polymer. The melt flow bore 114, which is the passageway in which the molten polymer travels, is sealed from an unheated clamp plate 102 and parts interior to it by a manifold seal 116. Often, a small chamber 118 separates the manifold seal 116 and the cylinder 110.

The piston 108 is pneumatically moved along its axis 120 by selectively supplying a fluid, preferably air or an inert gas, into the cylinder 110 with the fluid acting on the piston 108. A close gate supply port (not shown) is disposed to be rearward of a rear pressure surface 122 of the piston 108, such that the close gate supply port is in fluid communication with the rear pressure surface 122 of the piston 108. As the piston 108 moves, the associated shutoff pin 112 moves with it, closing the gate 105 and shutting off the flow of molten polymer that flows down the melt-flow bore 114 and into the mold 107.

The piston 108 travels along its axis 120 inside the cylinder 110. Cylinder 110 rests inside the clamp plate 102 with the forward end 109 of the cylinder 110 directly contacting a hot manifold 104. A rear end 111 of the shutoff pin 112 is affixed to the piston 108 and passes through the cylinder 110 through a hole at its forward end. The shutoff pin 112 extends through the hot manifold 104 and into a manifold plate 106. The hot manifold 104 is heated to keep the polymer in its molten state. The forward end 113 of the shutoff pin 112 terminates at a nozzle seal 115 at a forward end of the manifold plate 106 and controls the flow of the molten polymer into the mold. Thus, the gate 105 is formed by the forward end 113 of the shutoff pin 112 and the nozzle seal 115. The gate 105 is closed when the piston 108 is in the forward position and open when the piston 108 is in the rear position. If the gate 105 is open, molten polymer passes through the gate 105 and into the mold cavity 132.

Referring to FIG. 1B, showing a prior art assembly 100 with the piston in the rear position, the piston 108 has a forward pressure surface 124 and a piston stop surface 126 which contacts a cylinder stop surface 128 on the forward wall 117 of the cylinder 110 when the piston is in the forward position. To raise the piston 108, the fluid enters through an open gate supply port 130 that is in fluid communication with the forward pressure surface 124.

As shown in FIGS. 1A and 1B, the piston stop surface 126 is radially inward of the forward pressure surface 124. Since the cylinder 110 is in direct contact with the heated hot manifold 104, thermal energy from the hot manifold 104 passes into the cylinder 110 and, when the piston 108 is in the forward position, then into the front end of the piston 108, creating a temperature gradient between the forward portions of the assembly 100 and the rear portions of the assembly. This heat transfer into the cylinder 108 is undesirable because the piston uses O-rings 119 to maintain the pneumatic pressure on the piston 108 and stop leakage of fluid from one side of the piston to the other. Heat from the hot manifold 104 causes the O-rings 119 to degrade. This causes increased maintenance time and lost production.

Accordingly, it is an object of the present invention to provide a system that reduces the heat transferred from the hot manifold 104 to the piston 108, thereby reducing maintenance on the system and increasing the run time.

Further, it is an object of the present invention to increase the ease of the maintenance of the injection molding systems by providing a system wherein the piston and the shutoff pin may be removed without removing the clamp plate from the hot manifold.

SUMMARY OF THE INVENTION

According to one aspect of the invention, a valve gate assembly for use with a hot manifold is formed around an axis and comprises a piston that is actuable within a cylinder between a forward position and a rear position along the axis. The piston has a cylindrical wall with a forward end and piston stop surface extending radially inwardly from the forward end of the cylindrical wall and terminating in a radially inward end. The piston has a forward pressure surface extending radially inwardly from the inward end of the piston stop surface such that a fluid acting on the forward pressure surface urges the piston in a rearward direction.

The cylinder has a cylindrical first wall that is formed to be parallel to the axis and that is axially displaceable along the wall. The assembly has a forward opening to be positioned adjacent to the hot manifold and communicates with a hot manifold pin hole.

The cylinder also has a cylinder stop surface that is disposed to contact the piston stop surface when the piston is in the forward position. The cylinder stop surface is radially outward of at least a portion of the forward pressure surface of the piston and a shutoff pin is substantially aligned with the axis. The shutoff pin has an elongated shaft with a front end that is forward of the cylinder and a rear end that is affixed to the piston. The shaft of the shutoff pin is passable through the forward opening and the hot manifold pin hole to a gate of the mold. The front end of the shutoff pin is operable to open and close the gate.

Preferably, the cylinder has a chamber that is forward of the cylindrical wall, an annular channel in the chamber, and a support member (such as a shoulder) that is forward of the channel. More preferably, a debris washer having a central hole contacts the support member and a retaining ring is disposed in the channel rearward of the debris washer.

In another embodiment, a valve gate assembly for use with a hot manifold is formed around an axis and comprises a piston that is actuable between a forward position and a rear position within a cylinder. The piston has a cylindrical wall with a forward end and piston stop surface extending radially inwardly from the forward end of the cylindrical wall and terminating in a radially inward end. The piston has a forward pressure surface extending radially inwardly from the inward end of the piston stop surface such that a fluid acting on the forward pressure surface urges the piston in a rearward direction.

The cylinder has a cylindrical first wall that is formed to be parallel to the axis and that is axially displaceable along the first wall. The assembly has a forward opening disposed to be adjacent to the hot manifold and communicates with a hot manifold pin hole. The cylinder also has a cylinder stop surface that is disposed to contact the piston stop surface when the piston is in the forward position. An open gate supply port is in fluid communication with the forward pressure surface and is forward of the cylinder stop surface.

According to another aspect of the invention, a chamber for collecting debris is forward of the forward end of a first cylindrical wall of the cylinder and the cylinder also has a purging supply port in fluid communication with the chamber for purging it with fluid and an exhaust port for purging fluid out of the chamber. Preferably, the purging supply port is forward of the cylinder stop surface.

In another aspect of the invention, a method of in situ purging of a shutoff valve of an injection molding apparatus comprises the steps of providing a chamber to be axially rearward of a manifold shutoff pin hole that opens into the chamber. A forward surface of the piston defines a rearward surface of the chamber.

The method further includes the steps of accumulating debris in the chamber and positioning a piston, which is actuable between a forward position and a rear position along an axis inside a cylinder, to a purging position. The debris typically results from polymer flowing from a polymer melt flow bore through the shutoff pin hole into the chamber. The method further comprises the steps of flowing a purging fluid from a purging supply port into a chamber and exhausting the purging fluid and debris out of an exhaust port that is in fluid communication with the chamber. Preferably, the piston is in the forward position when purging the fluid flows into the chamber.

According to another aspect of the invention, a valve gate assembly for injection molding comprises a clamp plate having a first bore with an axis and a first diameter and a second bore that is adjacent to and forward of the first bore. The second bore is aligned with the axis and has a second diameter that is larger than the first diameter. The apparatus further comprises a cylinder with a third diameter that is larger than the first diameter but is smaller than the second diameter. The cylinder is insertable into the second bore and a piston having a rear piston stop surface and a gate shutoff pin aligned with the axis and affixed to the piston is insertable into the cylinder through the first bore. A cover plate is disposed to be rearward of the rear piston stop surface and has a cover plate stop surface that is disposed to contact the rear piston stop surface with the piston in the rear position.

According to another aspect of the invention, a method of adjusting the stroke of a piston of a valve gate assembly comprises the step of providing a valve gate assembly having a cylinder and a piston actuable along an axis within the cylinder between a forward position and a rear position. The method further includes the step of providing a plurality of cover plates with each cover plate having at least one leg. Each leg has a predetermined length and a cover plate stop surface that contacts a piston stop surface when the piston is in the rear position. Finally, the method comprises the step of adjusting the stroke of the piston by replacing a first cover plate having a leg of a first predetermined length with a second cover plate having a leg of a second, different predetermined length. The legs from one cover plate may be modified by grinding or cutting to achieve the desired length.

BRIEF DESCRIPTION OF THE DRAWINGS

Further aspects of the invention and their advantages can be discerned in the following detailed description, in which like characters denote like parts and in which.

DETAILED DESCRIPTION

The invention has overcome the limitations of the prior art by moving the point at which the piston contacts the stop surface of the cylinder rearward and away from the hottest portions of the cylinder. This reduces the amount of heat transferred to the piston and the O-rings and extends the time between maintenance shutdowns. Additionally, by moving the piston rearward from the front of the cylinder, the invention has a chamber that is capable of collecting debris resulting from any molten polymer seeping past the manifold seal. The polymer may be one or a combination of any number of polymers including, but not limited to, polyethylene, polypropylene, thermoplastic elastomers, polyethylene terephthalate, fluoropolymers, polyesters, vinyl polymers, silicone, etc. Thus, the polymer that seeps past the manifold seal may form debris in the form of a continuous mass or, as in the case of polyethylene terephthalate, a plurality of granules (dust).

Figure 2A:
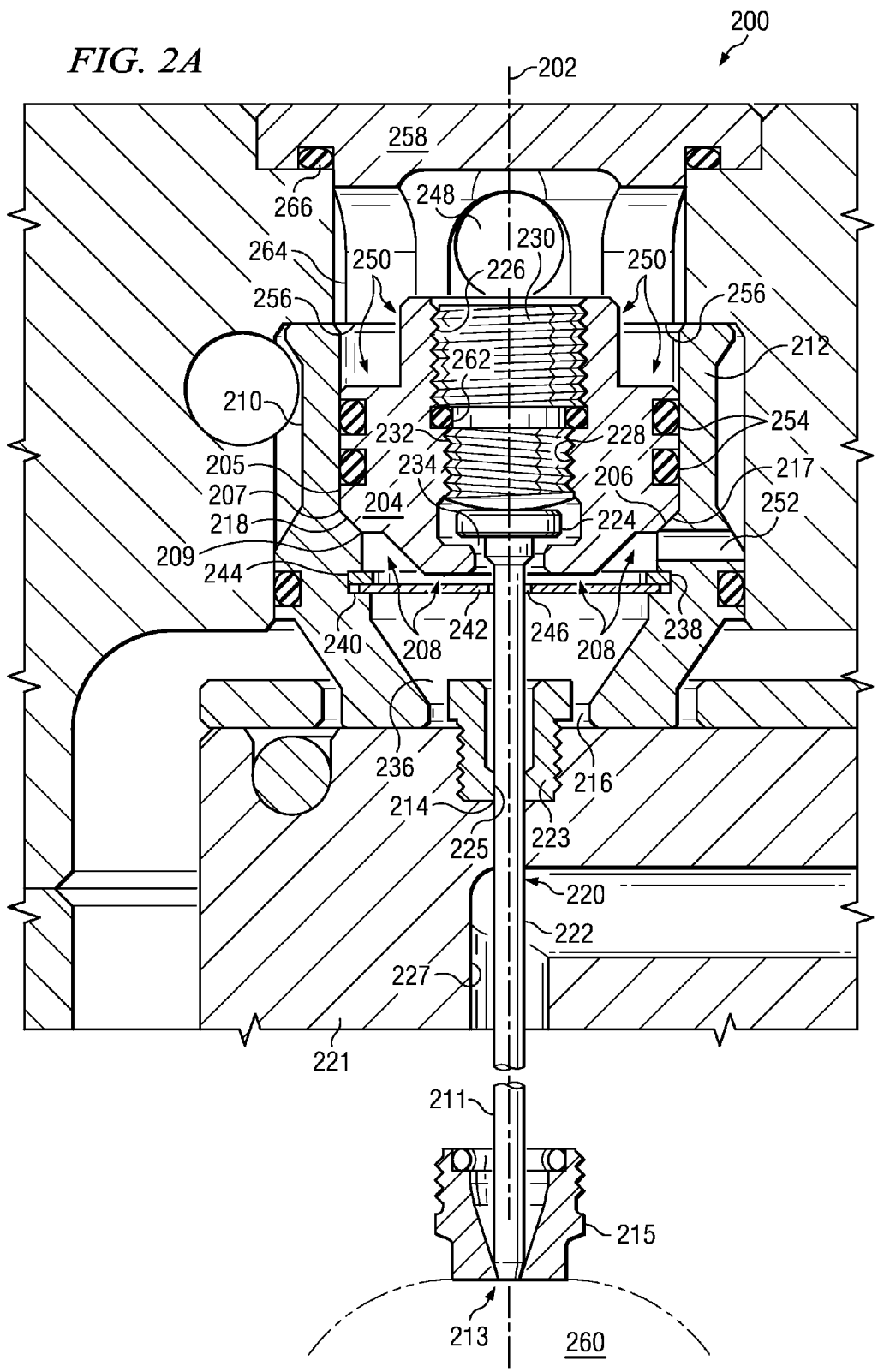
FIG. 2A is an axial sectional view according to another aspect of the invention showing a clamp plate, a hot manifold, a cylinder, shutoff pin, a manifold seal, a cover plate, a nozzle seal, and a piston in the forward position.
Figure 2B:
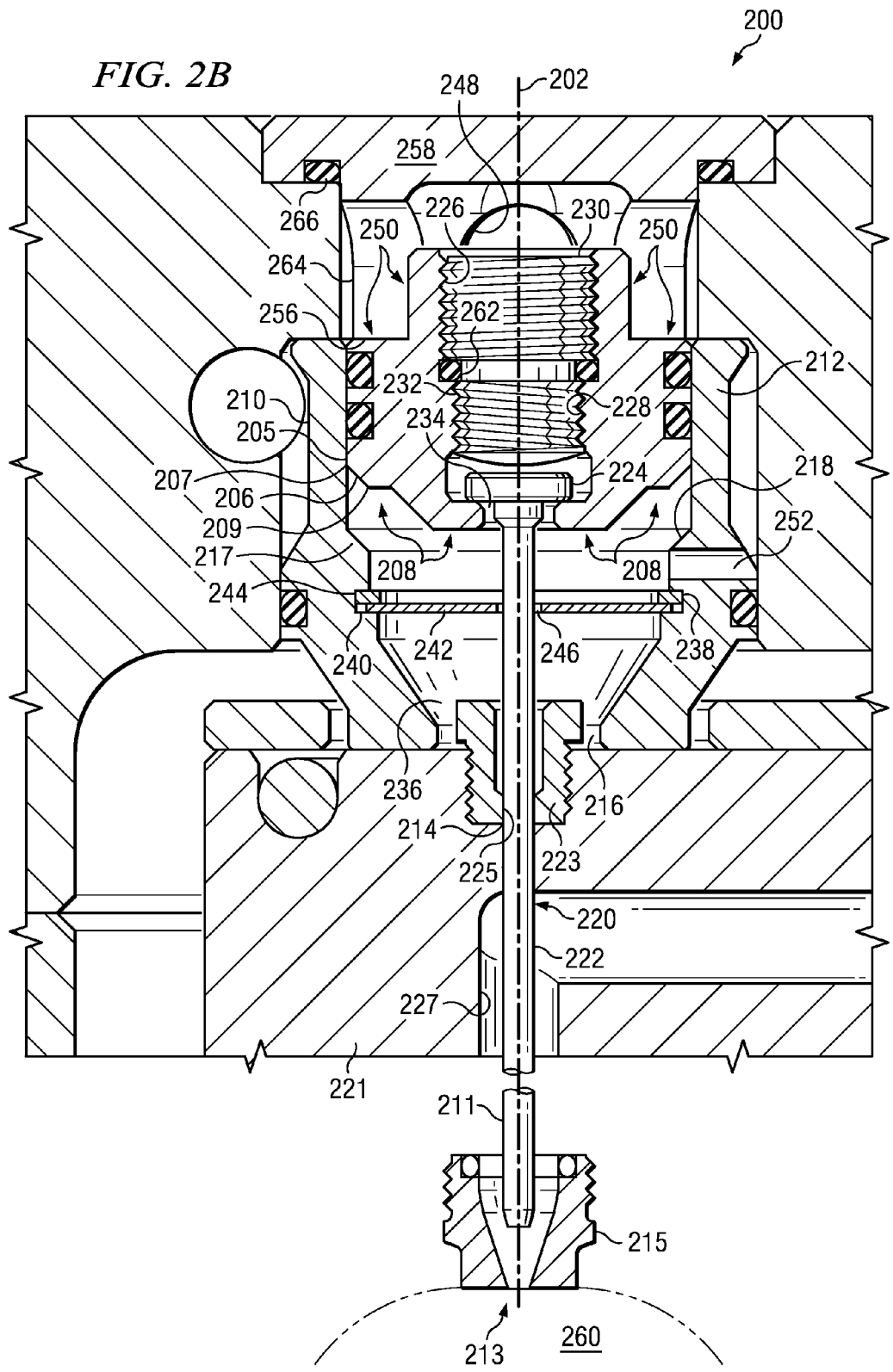
FIG. 2B is an axial sectional view according to another aspect of the invention showing a clamp plate, a hot manifold, a cylinder, shutoff pin, a manifold seal, a cover plate, a nozzle seal, and a piston in the rear position.
Figure 6:
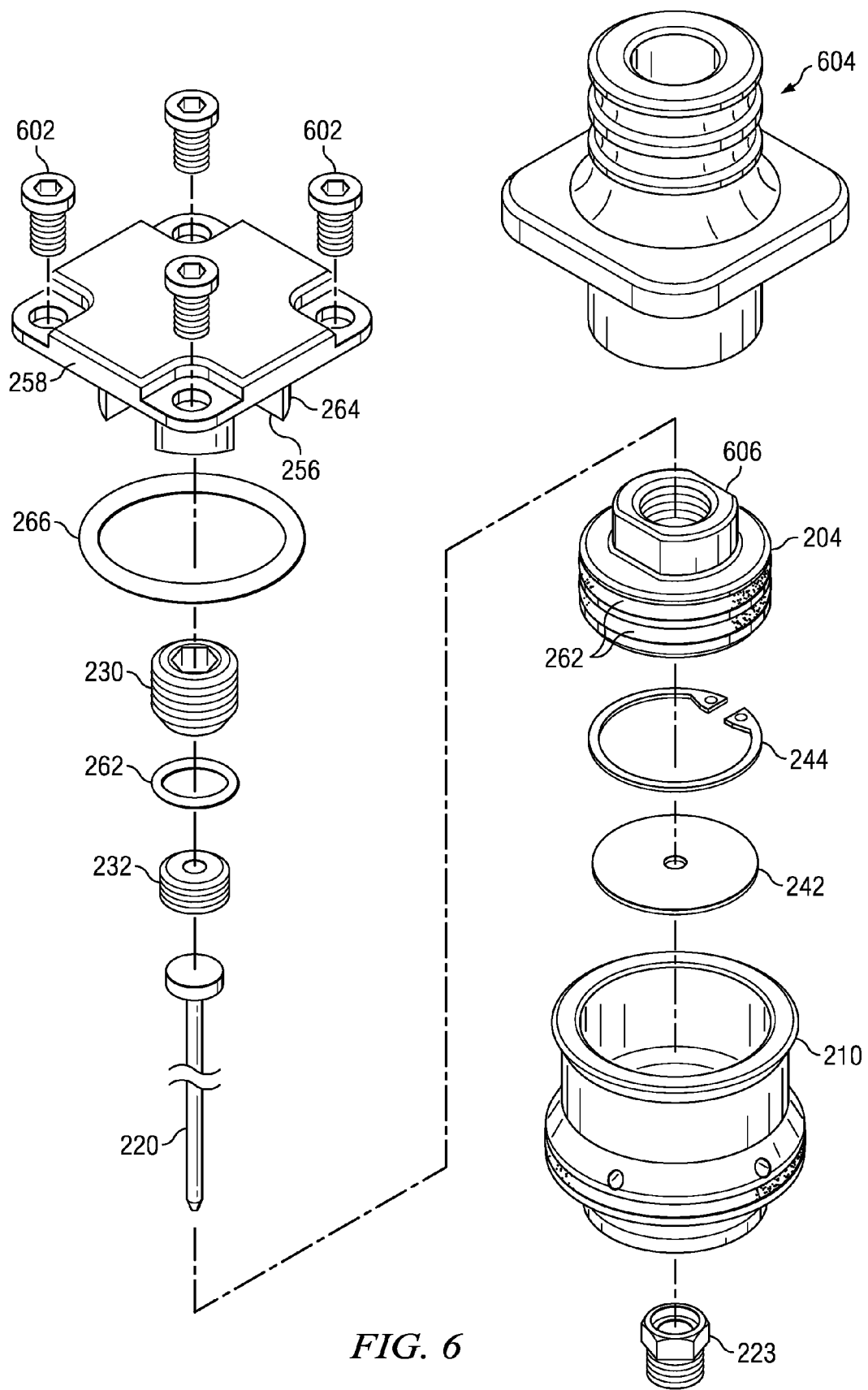
FIG. 6 is an axial exploded view of the injection molding apparatus and a set wrench.
Figure 8:
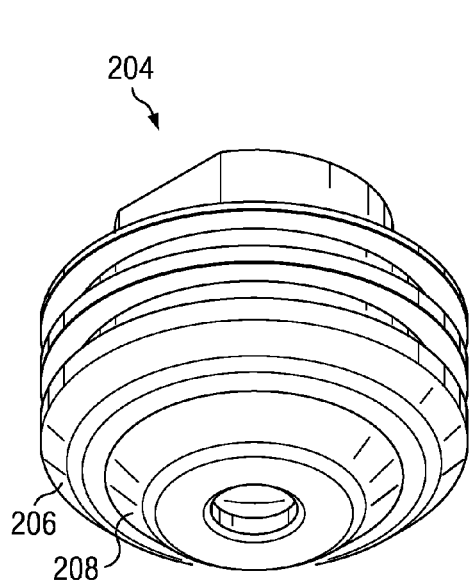
FIG. 8 is an isometric view of the piston showing the forward section thereof.
Figure 9:
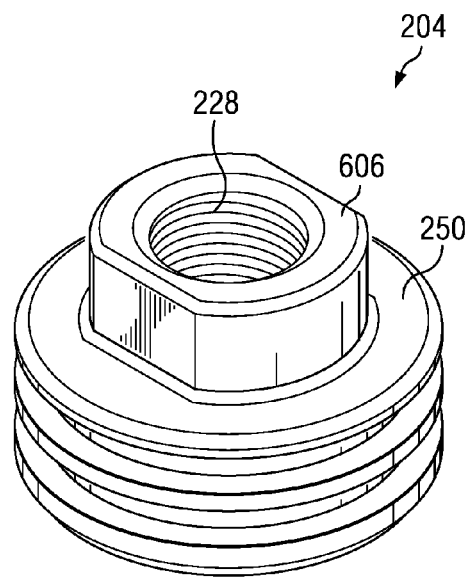
FIG. 9 is an isometric view of the piston showing the rearward section thereof.
Figure 10:
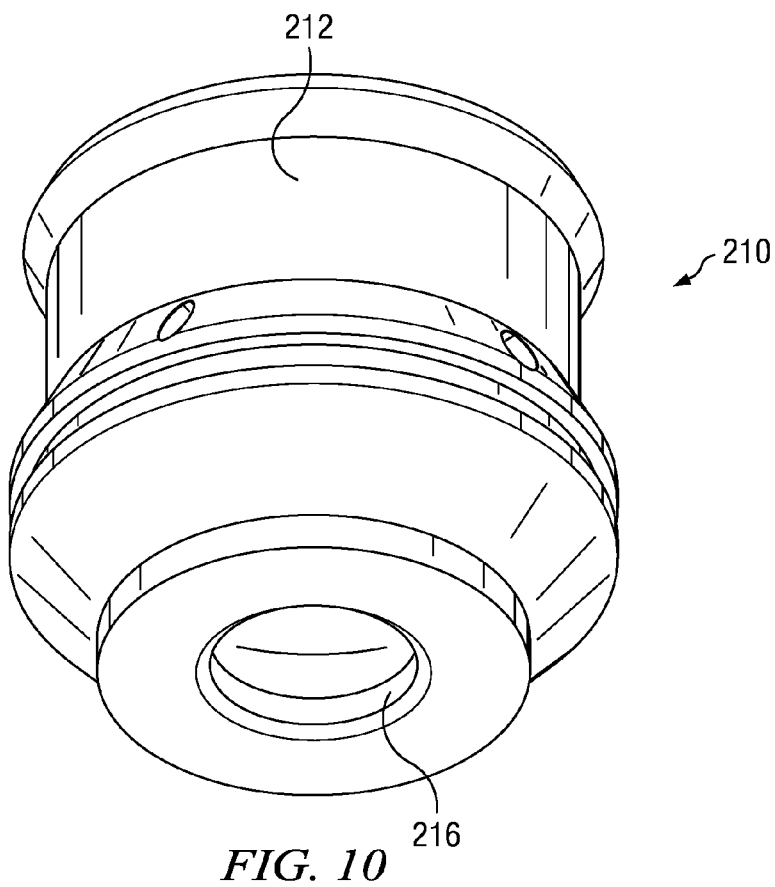
FIG. 10 is an isometric view of the cylinder showing the forward section thereof.
Figure 11:
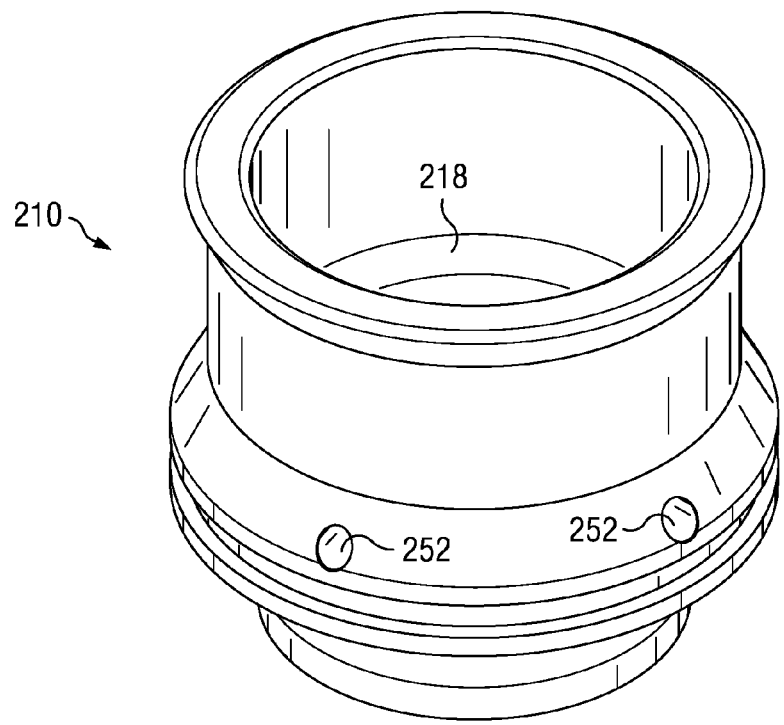
FIG. 11 is an isometric view of the cylinder showing the rearward section thereof.

Referring to FIG. 2A, FIG. 2B, and FIG. 6, a valve gate assembly, indicated generally at 200, is formed around an axis 202 and comprises a piston 204 that is actuable between a forward position (FIG. 2A) and a rear position (FIG. 2B) within a cylinder 210 (see also FIGS. 10 and 11). The piston 204 has a first wall 205 having a forward end 207, piston stop surface 206, and a forward pressure surface 208. The piston stop surface 206 extends radially inwardly from the forward end 207 and terminates at an inward end 209. The forward pressure surface 208 extends radially inwardly from the inward end 209 of the piston stop surface 206 (see FIGS. 8 and 9).

The cylinder 210 has a first cylindrical wall 212 formed to be parallel to the axis 202 and the piston 204 is axially displaceable along the first wall 212. A forward opening 216 of the cylinder 210 is positioned to be adjacent to the hot manifold communicates with a hot manifold pin hole 214. The first wall 212 of the cylinder 210 and the first wall 205 of the piston 204 may be circumferential around the axis 202, but the cylinder may have any additional walls that are necessary to give the cylinder the desired cross sectional shape. Thus, the cross section of the cylinder may be circular, triangular, rectangular, or any other shape where the piston is capable of reciprocating between the forward and backward positions within the cylinder.

The cylinder 210 has a cylinder stop surface 218 disposed to contact the piston stop surface 206 with the piston 204 in the forward position, the cylinder stop surface 218 being radially outward of at least a portion of the forward pressure surface 208. The cylinder stop surface 218 preferably comprises a frustoconical shoulder 217 that projects radially inwardly from the first wall 212 of the cylinder 210.

Figure 1A:
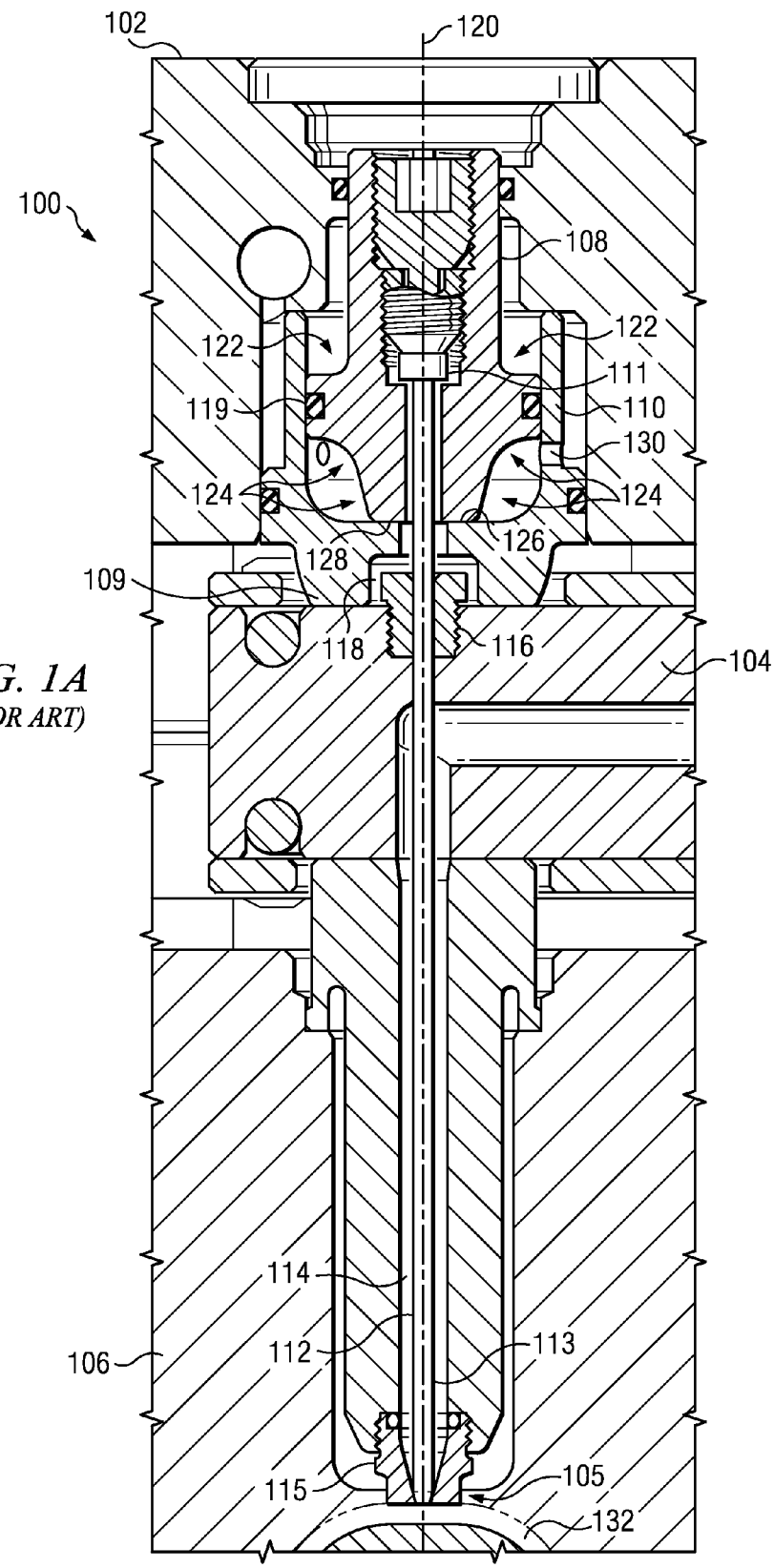
FIG. 1A is an axial sectional view of an injection molding apparatus according to the prior art showing a clamp plate, a cylinder, a hot manifold, a manifold plate, a shutoff pin, a nozzle seal, and a piston in the forward position.
Figure 1B:
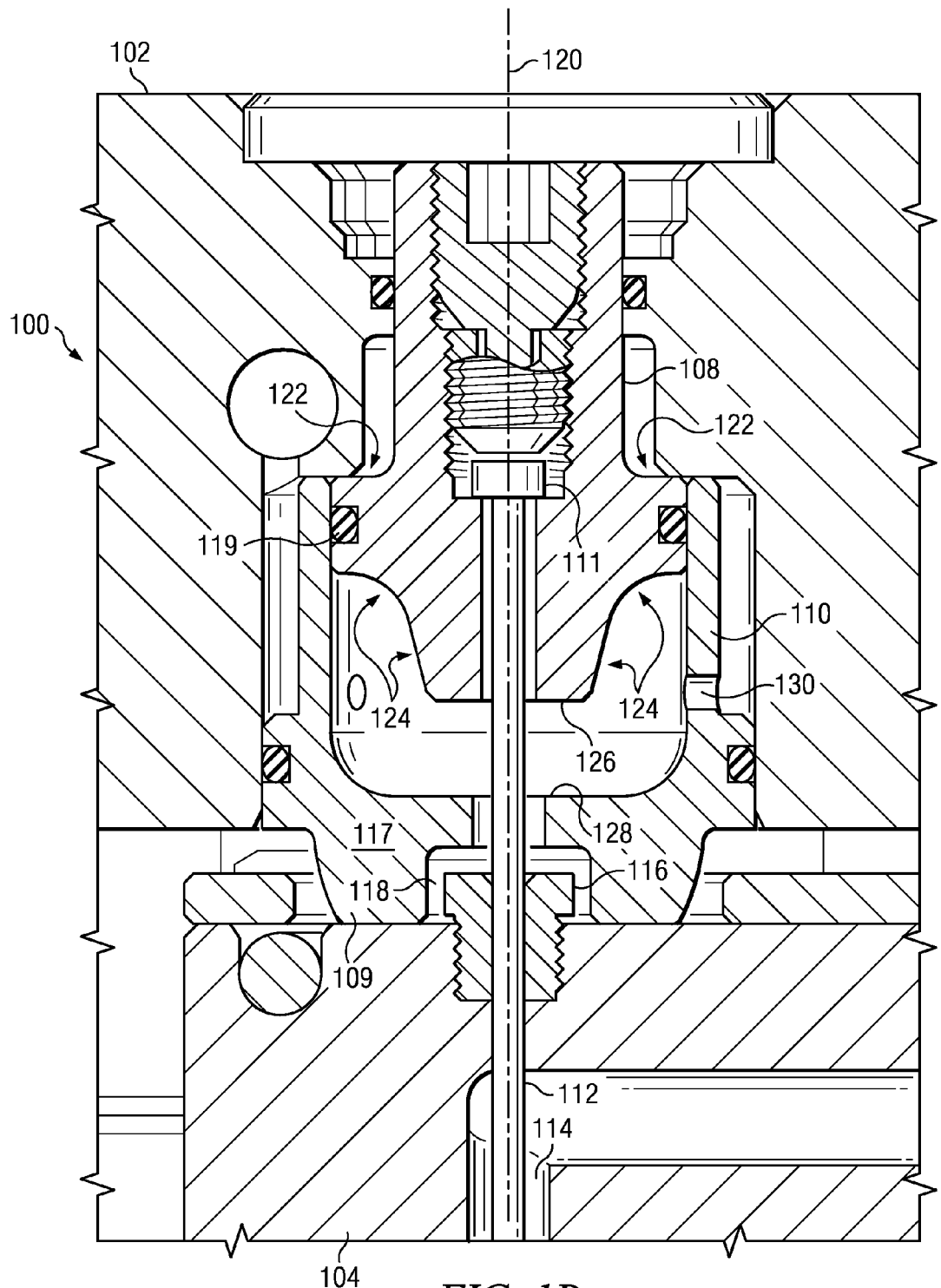
FIG. 1B is a view of the injection molding apparatus shown in FIG. 1A, but showing a clamp plate, a cylinder, a hot manifold, a manifold seal, a manifold plate, a shutoff pin, and a piston in the rear position.

Prior art FIGS. 1A and 1B show that the cylinder stop surface 128 contacts the cylinder close to the hot manifold 104. In contrast, FIG. 2A shows that the cylinder 210 contacts the cylinder stop surface 218 at a point that is farther axially rearward of the hot manifold 221 than in FIGS. 1A and 1B. This additional distance rearward allows thermal energy that is conducted from the hot manifold 221 into the cylinder 210 to be dissipated along a greater axial distance. Thus, less thermal energy enters the piston 204, the life of the O-rings 254 is extended, and less maintenance time is required.

Additionally, a shutoff pin 220 is substantially aligned with the axis 202 and has an elongated shaft 222 with a front end 211 forward of the cylinder 210 and a rear end 224 that is affixed to the piston 204. Preferably, the rear end is removably affixed to the piston by inserting the front end 211 through a piston hole 234 with a diameter larger than the diameter of the shaft 222 of the shutoff pin 220. The rear end 224 of the shutoff pin 220 is receivable into the piston 204 but is not capable of passing through the piston pin hole 234. The rear end 224 operates with the second positioning member 232 to affix the shutoff pin 220 to the piston 204.

The shaft 222 is also passable through the forward opening 216, is received into the hot manifold pin hole 214, passes through the hot manifold 221 into the melt flow bore 227, and operates to open and close the gate 213. The gate 213 may be formed by the front end 211 of the shaft 222 and a nozzle seal 215, or can be formed by the front end 211 of the pin 220 and the steel of the mold cavity 260 (not shown). Once the gate 213 is open, molten polymer passes through the gate 213 and into the mold cavity 260.

The cylinder 210 is affixed by compression to the hot manifold 221, which has a preferably screw-threaded a manifold seal 223. The manifold seal 223 preferably has a plurality of protrusions (not shown) extending from the wall of an inside bore 225 thereof to reduce the amount of molten polymer seeping from the melt flow bore 227.

In a preferred embodiment, the piston 204 has a threaded first bore 226, a threaded second bore 228, a first externally-threaded positioning member 230 that is receivable into the first bore 226, and a second externally-threaded positioning member 232 that is receivable into the second bore 228. More preferably, an O-ring 262 seals the threads of the first and second positioning members 230, 232 and prevents leakage of fluid through the threads between the two sides of the piston 204.

Figure 12:
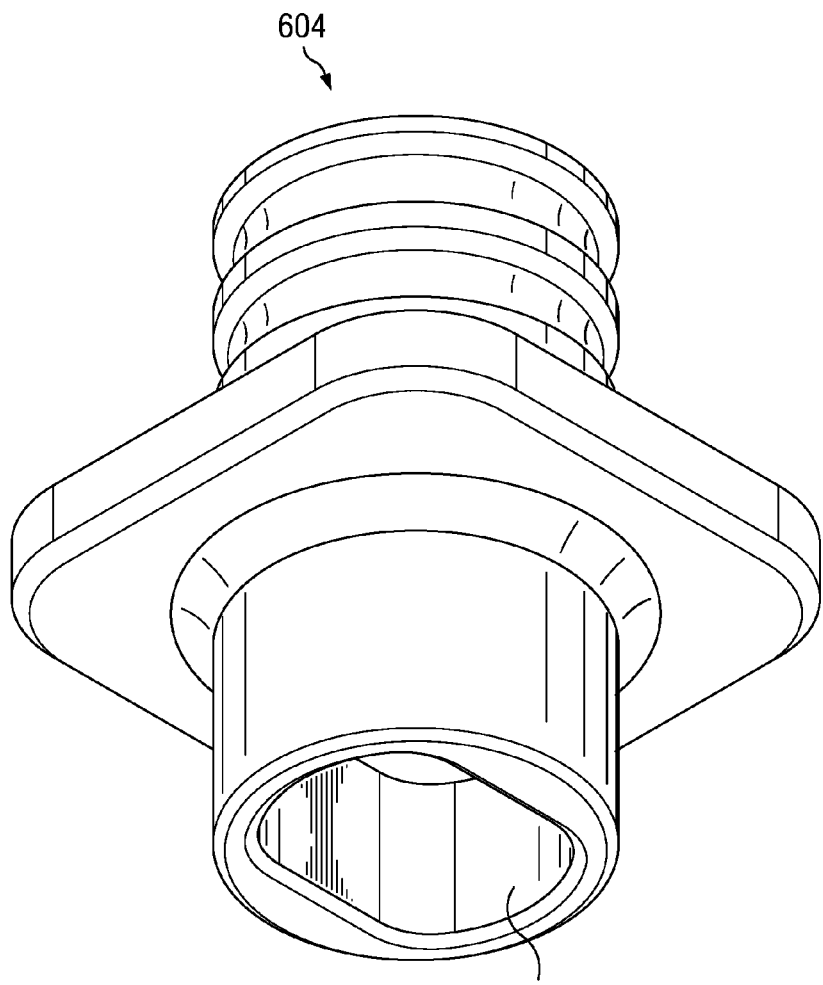
FIG. 12 is an isometric view of the set wrench showing the forward section thereof.

More preferably, the first and second bores 226, 228 are oppositely threaded so the shutoff pin 220 may be adjusted forwardly or rearwardly along the axis 202. This is advantageous because the dimensions of the shutoff assembly 200 must be precisely adjusted to prevent damage to the shutoff pin 220 or the nozzle seal 215 and because the length of the shutoff pin 220 will vary according to its temperature. To position the positioning members 230, 232, the first positioning member 230 is adjusted to the desired position in the second bore 228. The second positioning member 232 is then inserted into the first bore 226. A hollow set wrench 604 (see FIGS. 6 and 12) having a first fitting 1202 is placed over a complementary second fitting 606 on the piston 204 to prevent rotation of the piston 204 as the second positioning member 232 is tightened against the first positioning member 230.

The new design has the additional advantage of creating a large chamber 236 that is forward of the cylindrical wall 212 of the cylinder 210. Typically, a small amount of molten polymer from the melt flow bore 227 seeps by the manifold seal 223. If too much polymer leaks by, it can damage the assembly 200 or affect the ability of the piston 204 to move all the way into the forward position and stop the flow of the molten polymer. The larger chamber 236 acts as a reservoir for debris and, in turn, increases the time between maintenance shutdowns.

Preferably, the chamber 236 has an annular channel 238 and a support member or shoulder 240. The chamber 236 has a first diameter at this approximate axial location, and the annular channel 238 has a second diameter that is larger than the first diameter. The chamber 236 preferably has a debris washer 242 affixed within the chamber 236 across the axis 202 to span the chamber. Debris washer 242 acts as a barrier to any debris contacting the cylinder stop surface 218. The debris washer 242 has a washer hole 246 that is substantially aligned with the axis 202 such that the shutoff pin 220 can pass through the washer hole 246. The debris washer 242 may be affixed in the chamber 236 with a retaining ring 244 in the channel rearward of the debris washer 242 and typically rests on the support member or shoulder 240 that is forward of the channel 238.

More preferably, the support member 240 is a ledge that is radially inward of the channel 244. The diameter of the debris washer 242 is larger than the diameter of the shoulder 240 but is smaller than the second diameter. Thus, the debris washer 242 is radially expandable and contractable within the channel 238. This has the benefit of allowing the debris washer 242 to move as the assembly 200 heats up.

In order to move the piston 204 to the forward position, a close gate supply port 248 is disposed to be rearward of a rear pressure surface 250 of the piston 204, such that the close gate supply port 248 is in fluid communication with the rear pressure surface 250 when the piston 204 is in the rear position. Fluid (such as air) is introduced through the close gate supply port 248 and acts upon pressure surface 250 to urge the piston 204 forward (in FIG. 2A, downward).

To move the piston 204 to the rear position (FIG. 2B), the fluid under pressure is supplied through an open gate supply port 252 in fluid communication with the chamber 236 and the forward pressure surface 208 of the piston 204. The fluid acts on pressure surface 208 to urge the piston 204 rearward (upward in FIG. 2B) until the piston 204 contacts a cover plate 258 having one or more legs 264. See also FIGS. 6 and 7. The cover plate 258 is attached to the clamp plate with one or more bolts 602 (see FIG. 6) and sealed with an O-ring 266. The legs 264 have a cover plate stop surface 256 which contacts the piston 204 and prevents further rearward movement of the piston 204.

In an another embodiment and still referring to FIGS. 2A & 2B, an open gate supply port 252 is forward of the cylinder stop surface 218 and is in fluid communication with the forward pressure surface 208. As above, the cylinder stop surface 218 preferably comprises an annular shoulder 217 that projects radially inwardly from the first wall 212. The portion of the chamber 236 that is forward of the debris washer collects any debris that leaks past the manifold seal 223.

Figure 3:
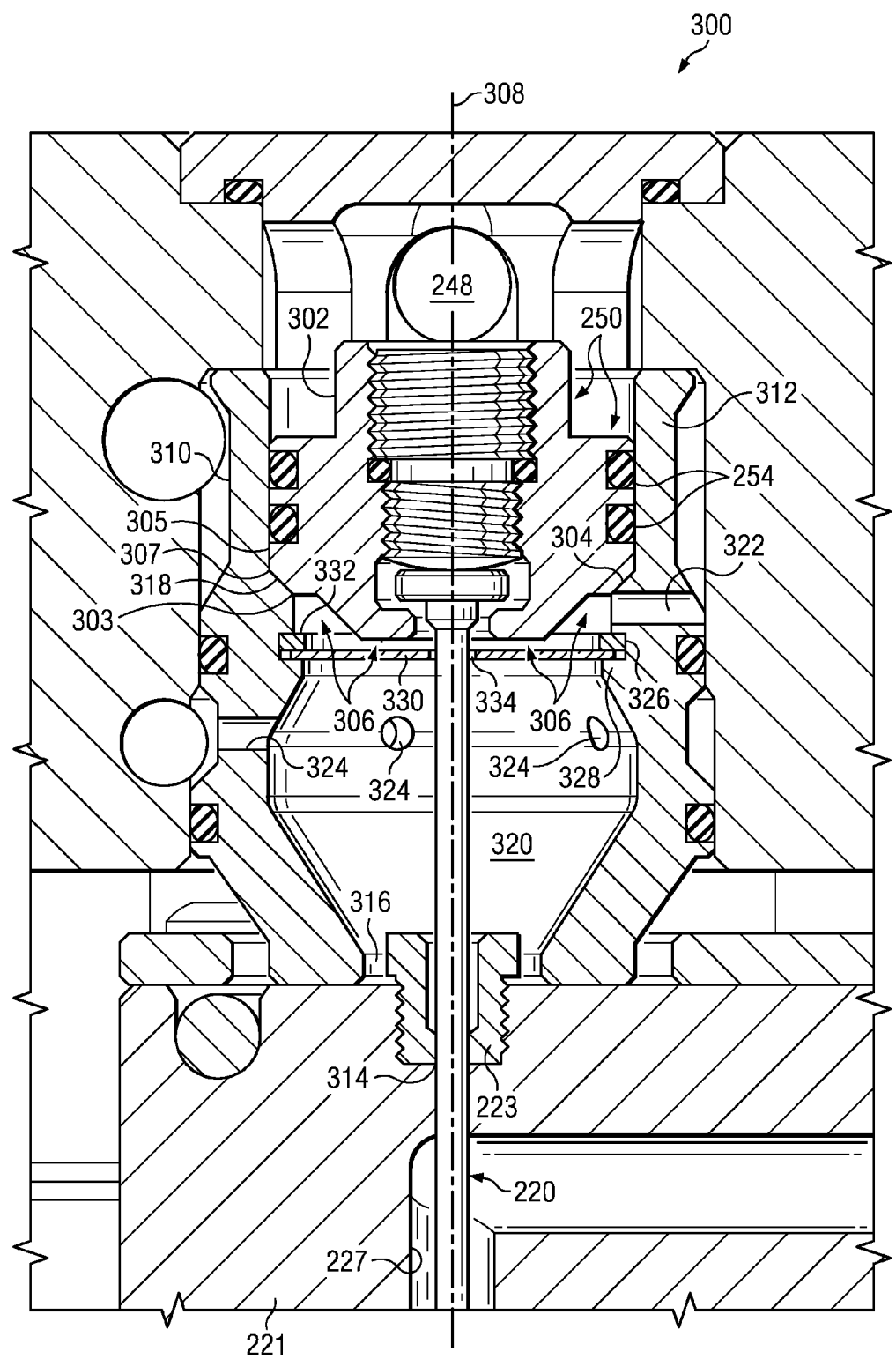
FIG. 3 is an axial sectional view according to another aspect of the invention showing a clamp plate, a hot manifold, a manifold seal, a cylinder, shutoff pin, a cover plate, and a piston in the forward position.

In another embodiment and referring to FIG. 3, a valve gate assembly, indicated generally at 300, comprises a piston 302 that is actuable between a forward position and a rear position within a cylinder 310. The piston 302 has a first cylindrical wall 305 having a forward end 307, a piston stop surface 304, and a forward pressure surface 306. The piston stop surface 304 extends radially inwardly from the forward end 307 and terminates at an inward end 303. A forward pressure surface 306 extends radially inwardly from the inward end 303 of the piston stop surface 304. A fluid acts on the forward pressure surface 306 to urge the piston 302 in a rearward direction.

The cylinder 310 has a first cylindrical wall 312 formed to be parallel to the axis 308 and the piston 302 is axially displaceable along the first wall 312. A forward opening 316 in the cylinder 310 communicates with a hot manifold pin hole 314.

The cylinder 310 further comprises a cylinder stop surface 318 that is disposed to contact the piston stop surface 304 with the piston 302 in the forward position, which is the position shown in FIG. 3. The cylinder 310 has an expanded chamber 320 that is forward of the inward end 303 of the piston stop surface 304.

Additionally, the cylinder 310 has a purging supply port 322 for purging the chamber 320 which is in fluid communication with the chamber 320. A plurality of exhaust ports 324 for exhausting the purging fluid out of the chamber 320 are in fluid communication with the chamber 320. The purging supply port 322 is preferably forward of the cylinder stop surface 318 and rearward of a debris washer 330. The purging supply port 322 may be the open gate supply port or a separate, dedicated line or port in fluid communication with the chamber 320.

As above, the chamber 320 has an annular channel 326 and a support member or shoulder 328 forward of the annular channel 326. The chamber 320 has a first diameter and the channel 326 has a second diameter that is larger than the first diameter. The debris washer 330 contacts the support member 328 and a retaining ring 332 is disposed in the channel 326 rearward of the debris washer 330. The debris washer 330 has a washer hole 334 that is substantially aligned with the axis 308 and receives the shutoff pin 220.

Figure 4:
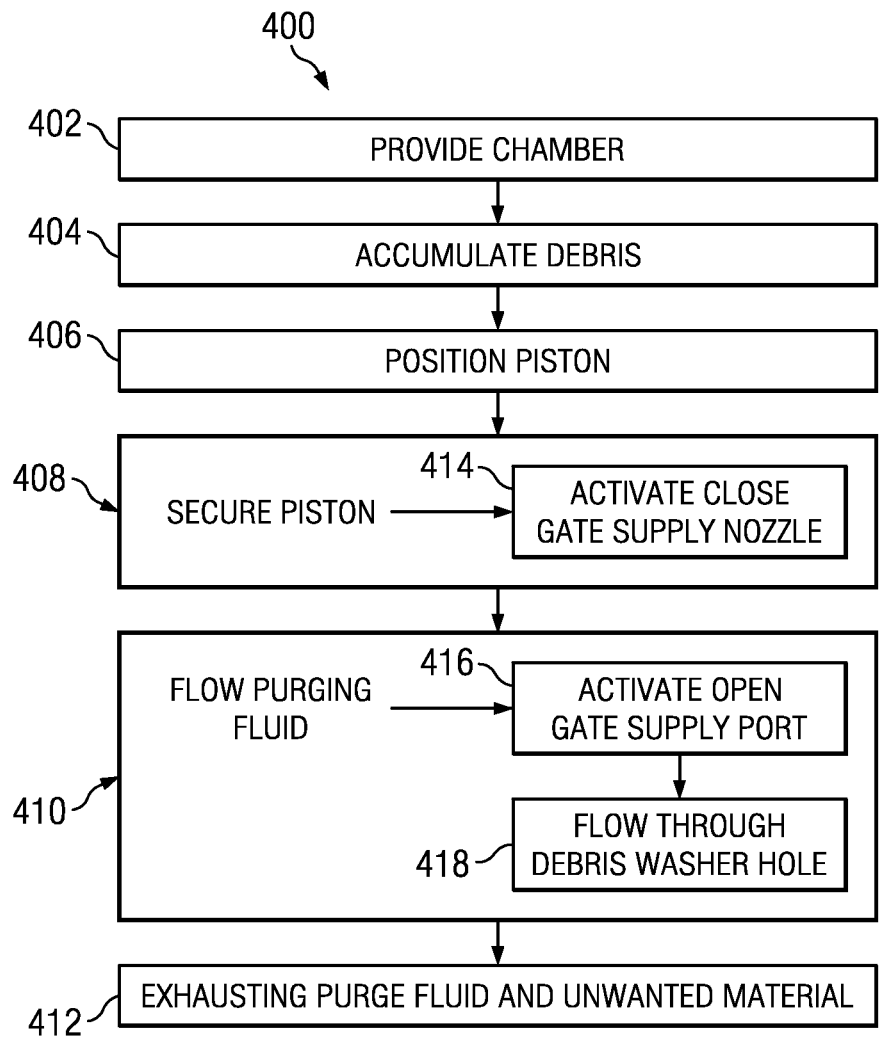
FIG. 4 is a flow diagram showing a method for in situ purging of an injection molding apparatus.

Referring to FIG. 4, a method, indicated generally at (400), of in situ purging of a gate valve system 300 of an injection molding apparatus comprises the steps of providing (402) a chamber 320 to be axially rearward of a hot manifold pin hole 314, the hot manifold pin hole 314 opening into the chamber 320 and a forward pressure surface 306 of a piston 302 defining a rearward surface of the chamber 320.

The method further comprises accumulating (404) debris in the chamber 320, positioning (406) the piston 302 in a purging position, and flowing (410) a purging fluid from a purging supply port 322 into the chamber 320. The method further comprises exhausting (412) the fluid and debris out of at least one exhaust port 324 that is in fluid communication with the chamber 320.

The method preferably comprises the step of securing (408) the piston 302 in the purging position. This step is done so that none of the purging fluid pressure or force is relieved by displacing the piston 302 upward within the cylinder 310. The purging position of the piston 302 may be the forward position, the rear position, and any position in between. Preferably, the purging position is the piston 302 in the forward position because it minimizes the residence time of the purging fluid and keeps the debris from settling in between a piston stop surface 304 and the cylinder stop surface 318. The piston 302 may be secured (408) into the purging position by activating (414) a close gate supply port 248 that is in fluid communication with a back pressure surface 250 of the piston 302.

More preferably, the step of flowing (410) the purging fluid from a purging supply port comprises the substep of activating (416) an open gate supply port 322. Thus, the close gate supply port 248 and the open gate supply port 322 may be active at the same time, such that the fluid entering through the open gate supply port 322 flows into the chamber 320 and out the exhaust port or ports 324.

Most preferably, the step of flowing (410) purging fluid further comprises the substep of flowing (418) the purging fluid forward through the debris washer hole 334 in a debris washer 330 that is forward of the purging supply port 322 and rearward of the exhaust port 324. This ensures that the debris moves generally forward from the rear of the chamber 320 to the exhaust port 324.

Figure 5:
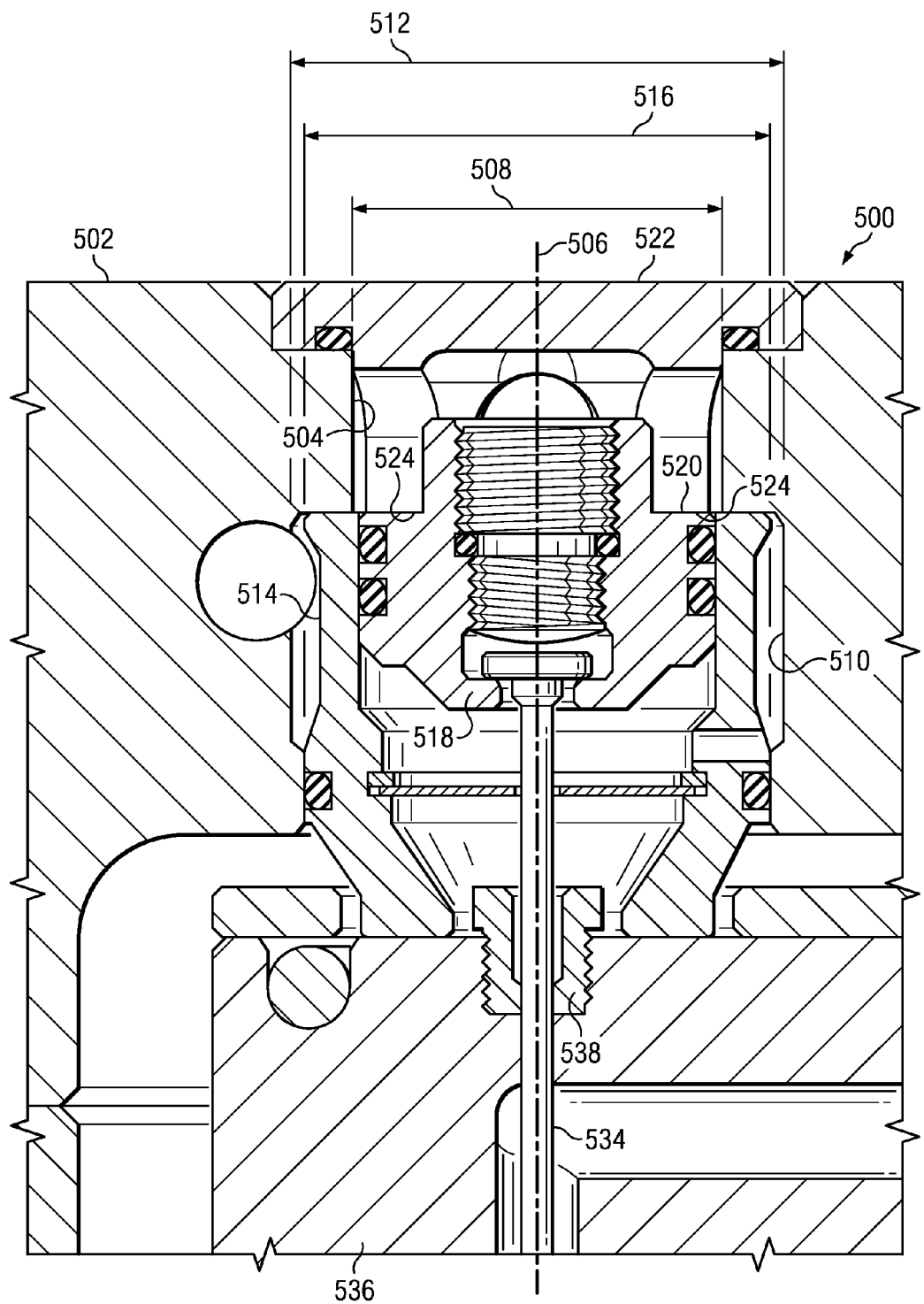
FIG. 5 is an axial sectional view of an injection molding apparatus according to another aspect of the invention showing a clamp plate, a cylinder, a hot manifold, a shutoff pin, and a piston in the rear position.

Referring to FIG. 5, a valve gate assembly, indicated generally at 500, comprises a clamp plate 502 having a first bore 504 having an axis 506 and a first diameter 508. The clamp plate 502 further comprises a second bore 510 adjacent to and forward of the first bore 504. The second bore 510 is aligned with the axis 506 and has a second diameter 512 that is larger than the first diameter 508.

The assembly 500 further comprises a cylinder 514 having a third diameter 516 that is larger than the first diameter 508 but is smaller than the second diameter 512. The cylinder 514 is insertable into the second bore 510 and a piston 518 having a rear piston stop surface 520 is insertable into the cylinder 514 through the first bore 504.

A cover plate 522 is disposed to be rearward of the rear piston stop surface 520 and has a cover plate stop surface 524 disposed to contact the rear piston stop surface 520 with the piston 518 in the rear position. This is advantageous because the piston 204 and the shut off pin 220 can easily be removed from the assembly 500 by removing the cover plate 522. In contrast, the prior art of FIG. 1 requires that the clamp plate 102 be separated from the hot manifold 104 to remove the piston, significantly increasing maintenance time.

Figure 7:
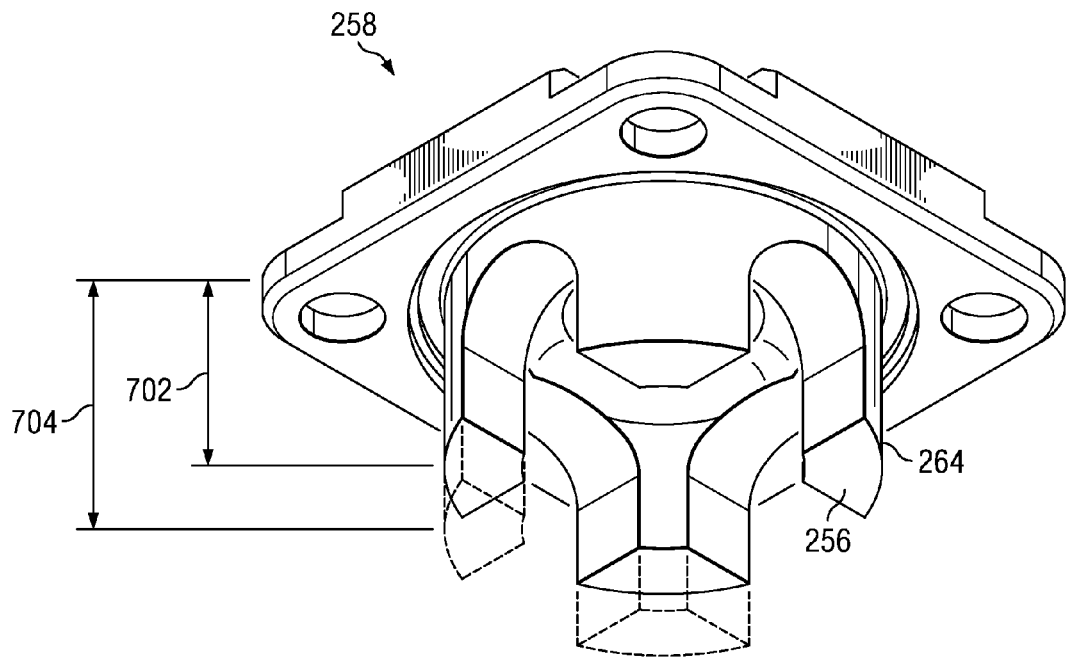
FIG. 7 is an isometric view of the cover plate showing the forward section thereof.
Figure 13:
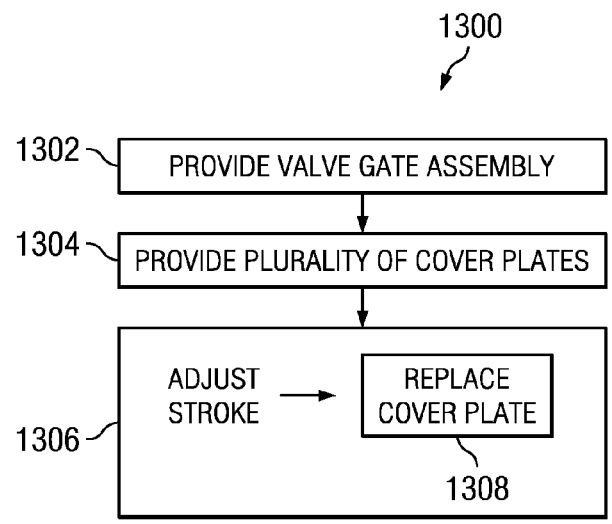
FIG. 13 is a flow diagram showing a method for adjusting the stroke of a piston of a valve gate assembly.

Referring to FIGS. 7 and 13, a method (1300) for adjusting the forward and backward distance, or stroke, of the piston 204 comprises the steps of providing (1302) the valve gate assembly 200 and providing (1304) a plurality of the cover plates 258, with each cover plate 258 having at least one leg 264. Each leg 264 has at least one predetermined length 702 and a cover plate stop surface 256 that contacts the rear piston stop surface 520 with the piston 204 in the rear position. The stroke of the piston 204 may be adjusted (1306) by replacing (1308) the cover plate 258 with a different cover plate having legs 264 of a second, different predetermined length 704. Alternatively, the legs from one cover plate 258 may be modified by grinding or cutting to achieve the desired length. The second length 704 may be longer or shorter than the first predetermined length 702.

In summary, the described embodiments of the invention are an improvement over the prior art because the cylinder stop surface is moved rearward, reducing the heat transferred to the piston and the O-rings on the piston. Moving the stop also has the added benefit of creating a large chamber in which polymer or other debris may accumulate. Finally, the piston and/or the shutoff pin may be removed from the assembly without having to disassemble the assembly.

While illustrated embodiments of the present invention have been described and illustrated in the appended drawings, the present invention is not limited thereto but only by the scope and spirit of the appended claims.

I claim:

1. A method of in situ purging of a shutoff valve debris chamber of an injection molding apparatus comprising the steps of
    providing a chamber to be axially rearward of a manifold shutoff pin hole, the shutoff pin hole opening onto the chamber, a forward surface of a piston defining a rearward surface of the chamber;
    using an open gate supply port in fluid communication with the forward surface of the piston to displace the piston rearwardly to an open gate position;
    responsive to displacing the piston rearwardly to the open gate position, flowing polymer through a polymer melt flow bore coaxial with the shutoff pin, and through a gate into a mold;
    while performing said step of flowing the polymer, accumulating debris in the chamber resulting from polymer flowing from a polymer melt flow bore through the shutoff pin hole into the chamber;
    after said step of flowing the polymer, positioning the piston in a purging position;
    flowing a purging fluid from the open gate supply port into and through the chamber; and
    exhausting the purging fluid and debris out of the mold from an exhaust port in fluid communication with the chamber.

2. The method of claim 1, further comprising the step of securing the piston in the purging position.

3. The method of claim 2, wherein the purging position is a rear position of the piston in a cylinder.

4. The method of claim 1, wherein the step of positioning the piston in the purging position further comprises the substep of activating a close gate supply port in fluid communication with a rear pressure surface of the piston.

5. The method of claim 1, wherein the step of flowing the purging fluid from an open gate supply port comprises the substep of flowing the purging fluid forward through a debris washer hole in a debris washer disposed in the chamber, the debris washer being disposed forward of the open gate supply port and rearward of the exhaust port.

6. The method of claim 1, and further comprising the steps of:
    housing the piston within a cylinder;
    housing the cylinder within a valve assembly body;
    providing a conduit from the exhaust port in the chamber through a wall of the cylinder to an exhaust bore in the assembly body; and
    disposing seals axially rearward and forward of the conduit between the assembly body and the cylinder, thereby directing exhaust from the chamber through the conduit, into the exhaust bore and to the exterior of the assembly.

7. A method of in situ purging of a shutoff valve pin debris chamber of an injection molding apparatus comprising the steps of:
    providing a chamber to be axially rearward of a manifold seal pin hole opening onto the chamber, a forward surface of a shutoff pin piston defining a rearward surface of the chamber;
    accumulating debris in the chamber, the debris resulting from polymer flowing from a polymer melt flow bore through the shutoff pin hole into the chamber;
    positioning the piston in a forward, purging position;
    flowing a purging fluid from a purging supply port into and through the chamber; and
    exhausting the purging fluid and debris out of an exhaust port in fluid communication with the chamber.

8. The method of claim 7, wherein the step of flowing a purging fluid from a purging supply port comprises the substep of activating an open gate supply port.

9. The method of claim 7, and further comprising the steps of
    disposing the piston in a cylinder;
    disposing the cylinder in a valve gate assembly body;
    forming a conduit from the exhaust port in the chamber through the cylinder and to a bore in the assembly body; and
        disposing seals between the cylinder and the assembly body at locations axially forward and axially rearward of the conduit, thereby directing exhaust out of the chamber, through the conduit, into the assembly body bore and to the exterior of the assembly body.

10. A method of operating an injection molding apparatus, comprising the steps of:
    using an open gate supply port to admit pressurized fluid into a first chamber forward of a valve gate piston and rearward of a manifold seal pin hole;
    responsive to the last said step of admitting pressurized fluid, displacing the piston, and a valve gate shutoff pin coupled thereto, in a rearward direction, thereby opening a gate to a mold;
    following the last said step of displacing the piston, accumulating debris in the first chamber, the debris resulting from polymer flowing from a polymer melt flow bore through the shutoff pin hole into the first chamber;
    using a close gate supply port to admit pressurized fluid into a second chamber rearward of the valve gate shutoff piston;
    responsive to the last said step of admitting pressurized fluid, displacing the piston and the valve gate shutoff pin in a forward direction, thereby shutting off the gate;
    using the close gate supply port and the pressurized fluid admitted thereby to fix the piston in a forward, purging position; and
    while the piston is fixed in the forward, purging position, pressurizing the open gate supply port and opening an exhaust port in fluid communication with the chamber to purge the debris in the chamber out of the exhaust port.

11. The method of claim 10, and further comprising the steps of:
    disposing the piston in a cylinder;
    disposing the cylinder in a valve gate assembly body;
    forming a conduit from the exhaust port in the chamber through the cylinder and to a bore in the assembly body; and
    disposing seals between the cylinder and the assembly body at locations axially forward and axially rearward of the conduit, thereby directing exhaust out of the chamber, through the conduit, into the assembly body bore and to the exterior of the assembly body.

* * * * *